No. 683,583. Patented Oct. 1, 1901.
P. H. WHITE.
VEHICLE WHEEL.
(Application filed Feb. 11, 1901.)
(No Model.)
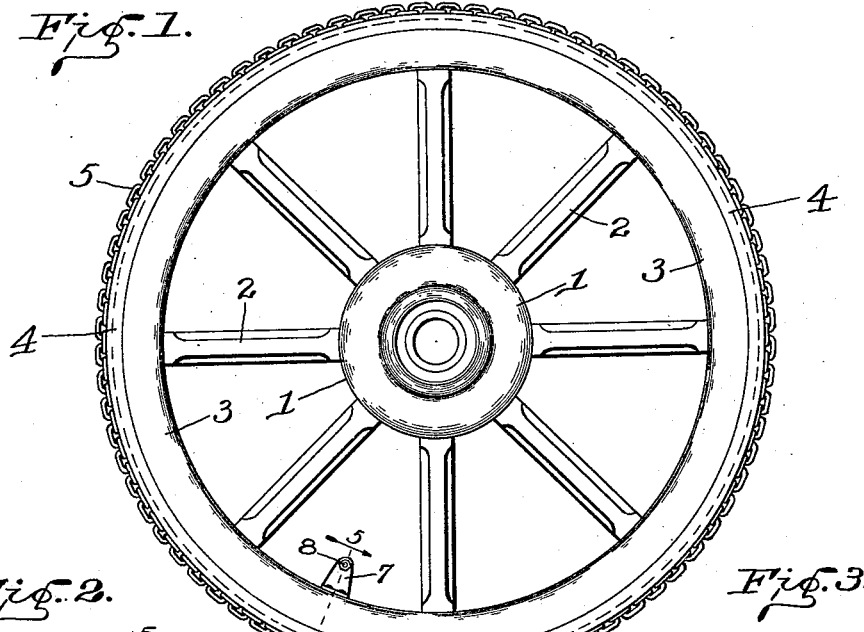
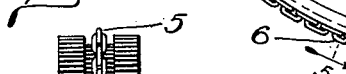
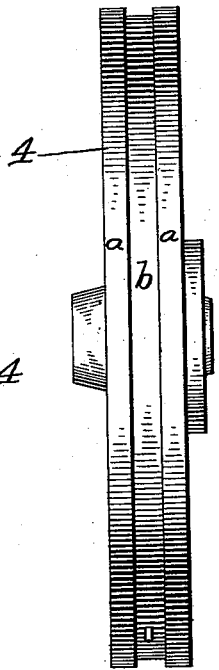
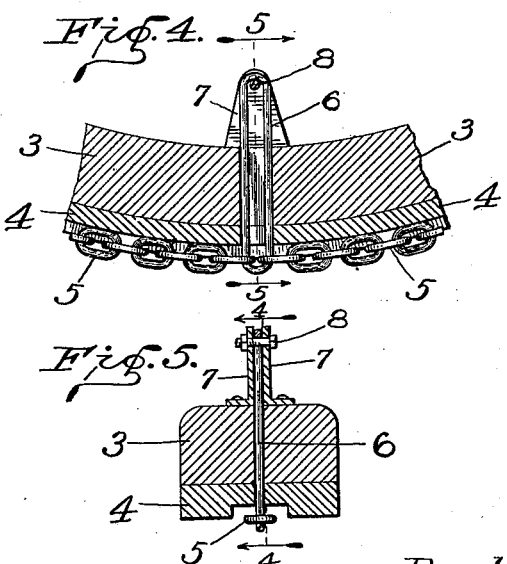
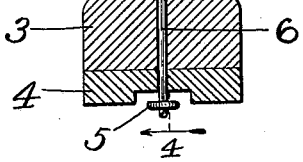
WITNESSES:
C. S. Frye.
J. A. Walsh.
INVENTOR
Paul H. White,
BY
Chester Bradford,
ATTORNEY
THE NORRIS PETERS CO., PHOTO-LITHO., WASHINGTON, D. C.

UNITED STATES PATENT OFFICE.

PAUL HELB WHITE, OF INDIANAPOLIS, INDIANA, ASSIGNOR TO THE WHITE STEAM WAGON COMPANY, OF SAME PLACE.

VEHICLE-WHEEL.

SPECIFICATION forming part of Letters Patent No. 683,583, dated October 1, 1901.

Application filed February 11, 1901. Serial No. 46,937. (No model.)

*To all whom it may concern:*

Be it known that I, PAUL HELB WHITE, a citizen of the United States, residing at Indianapolis, in the county of Marion and State of Indiana, have invented certain new and useful Improvements in Vehicle-Wheels, of which the following is a specification.

The object of my said invention is to provide a wheel for traction-vehicles which shall be suited to varying conditions and various sorts of roads over which the vehicle has to pass.

A wheel embodying my said invention will be first fully described and the novel features thereof then pointed out in the claims.

Referring to the accompanying drawings, which are made a part hereof, and on which similar reference characters indicate similar parts, Figure 1 is a side elevation of a wheel embodying my said invention; Fig. 2, an edge elevation thereof; Fig. 3, an edge elevation with the chain or outer tire removed; and Figs. 4 and 5, fragmentary sectional views on the dotted lines 4 4 and 5 5, respectively, in other of the figures.

The hub 1, spokes 2, and felly 3 of the wheel are or may be of any usual or desired description, and as the same are not peculiar to my present invention they will not be further described herein, except incidentally in describing said invention.

The tire 4 in its best form is a channeled tire, as shown. As will be noticed by the drawings, this tire as a whole is unusually wide and is thus suited to operate efficiently on soft, muddy, and yielding roads. The central portion, however, is channeled or grooved, the groove being preferably wide and shallow. The rims $a$ $a$ at the sides of the groove form narrow tire portions, which in the case of asphalt or other smoothly-paved streets are the only portions to come in contact with the surface of the streets, and these rims should be proportioned to together make a tire of the width required on the wheels of vehicles to be used on such streets in proportion to size and weight. When the vehicle having wheels of this description passes from these smoothly-paved streets onto ordinary soft dirt roads, the tire-rims $a$ $a$ will sink into the dirt sufficiently to permit the central portion $b$ to also come in contact with the earth, and thus a considerably-increased bearing-surface is automatically provided and a more efficient operation of the wheel secured. In such a case some of the dirt, especially when damp, will adhere to the surface of the tire within the channel, and in many cases, notably in case of the driving-wheels of a traction-engine or a steam-wagon, this aids materially in securing an efficient propulsion. In passing over surfaces which are difficult to traverse, however, such as in ascending hills and traversing icy, slippery, or unlevel roads, a further means of causing adherence to the surface over which the vehicle is passing is highly advantageous. I have found that a chain 5, placed around the periphery of the wheel, serves as such a means and constitutes a very desirable supplemental or auxiliary tire, and this is a leading feature of my invention. A chain of ordinary construction, however, obviously could not be placed on the wheel within the groove tightly against the surface and also be conveniently removable. I therefore provide a portion of a chain composed of one or more long links 6, which when extending in the same direction as the other links of the chain is sufficiently long to permit the chain to be slipped easily over the edges of the rim or tire part to the center and into the groove. It is then in the construction shown swung around at right angles with its former position and is suitably connected with the wheel-rim. In the construction shown its end is inserted into a perforation through the rim of the wheel, and it is driven into said perforation until one end of said link comes to about the position of one of the shorter links, while the other end has passed entirely through the rim of the wheel to inside the felly, where it may be secured by any suitable means, as by passing between ears 7, where a suitable keeper, as a bolt 8, may engage therewith. When it is desired to remove the chain, as when passing from roadways or surfaces of the condition specified back onto improved streets, it is done by simply pulling out the bolt, driving the link out endwise through the hole in the rim of the wheel, and turning said link to its first position, when the chain can be easily slipped off the wheel and thrown into the vehicle and carried along ready for further use, as will be readily understood.

I prefer to make the chain in question an open chain—that is, with one of the links a hook-link—so that the chain can be uncoupled and used as an ordinary chain when desired and also for the reason that its tension around the rim of the wheel can thus be easily regulated. If (under wear or otherwise) it slacks slightly and becomes too long to fit tightly around the wheel, it is easily tightened by unhooking the hook-link, twisting it a half-turn or more, and rehooking it, when it will be found that the slack has been taken up, and the chain will fit tightly around the wheel as before.

Having thus fully described my said invention, what I claim as new, and desire to secure by Letters Patent, is—

1. The combination, in a vehicle-wheel, of a channeled tire, and a chain secured to and extending around said tire within the channel and thus forming a roughened supplemental tire.

2. The combination of a vehicle-wheel, a supplemental chain tire therefor, and means whereby said supplemental chain tire may be removably secured around and in place upon said wheel.

3. The combination, with a vehicle-wheel, of a supplemental tire therefor composed of a chain having a long link, the rim of said wheel being perforated to receive said link, which, when said supplemental tire is in place, is passed through said perforation to the inside of the wheel-rim, whereby the supplemental tire is secured in place.

4. The combination, in a vehicle-wheel, of a rim having a radial perforation extending therethrough, a channeled tire forming the outer portion of said rim, and a supplemental tire composed of a chain adapted to lie in the channel in said tire and having a long link adapted to be turned at right angles with the length of the chain and passed in through the perforation in the wheel-rim.

5. The combination, in a vehicle-wheel, of a rim having a channeled tire adapted upon occasion to receive a supplemental tire, a perforation therethrough adapted to receive an adjusting and locking portion of said supplemental tire when the latter is in place, ears alongside said perforation, and a keeper carried by said ears.

6. The combination, in a vehicle-wheel, of a rim having a channeled tire adapted upon occasion to receive a supplemental tire, said supplemental tire having an adjusting and locking portion whereby the same is secured in place, and means whereby said adjusting and locking portion is secured to said rim and the supplemental tire thus fastened in place.

7. The combination, in a vehicle-wheel, with the rim thereof, of a wide tire having a shallow flat central channel therein, the remaining or side portions of the tire being of sufficient width to form a tread on smooth streets or roads and adapted to be supplemented by the remaining portion of the tire on softer streets or roads, whereby the surface of the tire is rendered variable according to the character of the streets or roads over which the wheel is passing, substantially as set forth.

In witness whereof I have hereunto set my hand and seal, at Indianapolis, Indiana, this 9th day of February, A. D. 1901.

PAUL HELB WHITE. [L. S.]

Witnesses:
CHESTER BRADFORD,
JAMES A. WALSH.